United States Patent
Fukuoka et al.

(10) Patent No.: US 10,439,185 B2
(45) Date of Patent: Oct. 8, 2019

(54) HYDROGEN-RELEASING FILM

(71) Applicant: NITTO DENKO CORPORATION, Ibaraki-shi, Osaka (JP)

(72) Inventors: Takahiro Fukuoka, Ibaraki (JP); Kyoko Ishii, Ibaraki (JP); Shunsuke Masaki, Ibaraki (JP); Kenta Hata, Ibaraki (JP); Hiroshi Yukawa, Nagoya (JP); Tomonori Nanbu, Suzuka (JP)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 0 days.

(21) Appl. No.: 15/318,856

(22) PCT Filed: Jun. 12, 2015

(86) PCT No.: PCT/JP2015/067000
§ 371 (c)(1),
(2) Date: Dec. 14, 2016

(87) PCT Pub. No.: WO2015/194470
PCT Pub. Date: Dec. 23, 2015

(65) Prior Publication Data
US 2017/0133648 A1    May 11, 2017

(30) Foreign Application Priority Data
Jun. 16, 2014  (JP) .................. 2014-123485

(51) Int. Cl.
*H01M 2/12*    (2006.01)
*B01D 69/10*    (2006.01)
(Continued)

(52) U.S. Cl.
CPC .......... *H01M 2/1264* (2013.01); *B01D 69/10* (2013.01); *B01D 69/12* (2013.01); *B01D 71/02* (2013.01);
(Continued)

(58) Field of Classification Search
None
See application file for complete search history.

(56) References Cited

U.S. PATENT DOCUMENTS 3,350,845 A    11/1967   McKinley
5,376,167 A    12/1994   Broutin et al.
(Continued)

FOREIGN PATENT DOCUMENTS

CN    101999153 A    3/2011
JP    S46-14801 B    4/1971
(Continued)

OTHER PUBLICATIONS

Communication issued in counterpart JP 2016-529303 dated Sep. 30, 2016.
(Continued)

*Primary Examiner* — Wyatt P McConnell
(74) *Attorney, Agent, or Firm* — Sughrue Mion, PLLC

(57) ABSTRACT

The objective of the present invention is to provide a hydrogen-releasing film, a composite hydrogen-releasing film and a hydrogen-releasing laminated film that are not prone to embrittlement in the usage environmental temperatures of electrochemical elements. The hydrogen-releasing film containing an alloy, wherein the alloy is a Pd—Au alloy, and the Au content in the Pd—Au alloy is 15 mol % or more.

11 Claims, 4 Drawing Sheets

(51) Int. Cl.

| | |
|---|---|
| *B01D 69/12* | (2006.01) |
| *B01D 71/02* | (2006.01) |
| *B01D 71/36* | (2006.01) |
| *B01D 71/38* | (2006.01) |
| *H01G 9/12* | (2006.01) |
| *H01G 11/14* | (2013.01) |
| *H01G 9/045* | (2006.01) |
| *H01M 10/0525* | (2010.01) |
| *C22C 5/04* | (2006.01) |

(52) U.S. Cl.
CPC ............ *B01D 71/36* (2013.01); *B01D 71/38* (2013.01); *H01G 9/045* (2013.01); *H01G 9/12* (2013.01); *H01G 11/14* (2013.01); *H01M 2/12* (2013.01); *H01M 2/1241* (2013.01); *H01M 10/0525* (2013.01); *C22C 5/04* (2013.01); *H01M 2200/20* (2013.01); *Y02E 60/13* (2013.01)

(56) References Cited

U.S. PATENT DOCUMENTS

| | | | | |
|---|---|---|---|---|
| 2001/0020416 | A1* | 9/2001 | Yoshikawa | H01G 9/12 |
| | | | | 95/45 |
| 2002/0182459 | A1* | 12/2002 | Hockaday | B01J 4/02 |
| | | | | 429/413 |
| 2005/0241477 | A1 | 11/2005 | Mundschau et al. | |
| 2008/0210088 | A1 | 9/2008 | Pledger | |
| 2011/0038101 | A1 | 2/2011 | Caumont et al. | |
| 2011/0232821 | A1* | 9/2011 | Saukaitis | B01D 53/228 |
| | | | | 156/60 |
| 2012/0012004 | A1 | 1/2012 | Way et al. | |
| 2012/0031833 | A1 | 2/2012 | Ho et al. | |

FOREIGN PATENT DOCUMENTS

| | | |
|---|---|---|
| JP | 62055339 U1 | 4/1987 |
| JP | 6355973 B2 | 11/1988 |
| JP | 05-330803 A | 12/1993 |
| JP | 07124453 A | 5/1995 |
| JP | 2000-233119 A | 8/2000 |
| JP | 2000-247605 A1 | 9/2000 |
| JP | 2001-29760 A | 2/2001 |
| JP | 2003-217546 A | 7/2003 |
| JP | 2003217549 A | 7/2003 |
| JP | 2003-297325 A | 10/2003 |
| JP | 2004-174373 A | 6/2004 |
| JP | 2005-502158 A | 1/2005 |
| JP | 2006-043677 A | 2/2006 |
| JP | 2006-055831 A | 3/2006 |
| JP | 2007117905 A | 5/2007 |
| JP | 2008-012495 A | 1/2008 |
| JP | 2008-077945 A | 4/2008 |
| JP | 2008-239353 A | 10/2008 |
| JP | 4280014 B2 | 6/2009 |
| JP | 2011512664 A | 4/2011 |
| JP | 2014-017051 A | 1/2014 |
| WO | 02/059990 A2 | 8/2002 |
| WO | 2007049130 A1 | 5/2007 |

OTHER PUBLICATIONS

International Search Report for PCT/JP2015/067000 dated Jul. 14, 2015.
Translation of PCT/IB/338 with attached Preliminary Report on Patentability (PCT/IB/373) and Written Opinion (PCT/ISA/237), received in counterpart PCT/JP2015/067000.
European Extended Search Report issued in corresponding Foreign Patent Application No. 15809679.2 dated Jan. 17, 2018.
Korean Office Action issued in corresponding Foreign Patent Application No. 10-2017-7000825 dated Oct. 20, 2017.
Chinese Office Action dated Oct. 8, 2018 from the State Intellectual Property Office of P.R. China in corresponding Chinese Patent Application No. 201580032750.
Japanese Office Action dated Nov. 27, 2018 from the Japanese Patent Office in corresponding Japanese Patent Application No. 2017-040863.
Communication dated Feb. 27, 2019 from the Japanese Patent Office in JP application No. 2017-040864.
Office Action dated Jun. 4, 2019 by China National Intellectual Property Administration in corresponding Chinese Application No. 201580032750.X.
Japanese Patent Office, Office Action (Decision of Refusal) dated Jul. 17, 2019 in Japanese Patent Application No. 2017-040863.
Asuka Suzuki et al., "Hydrogen Permeation Ability of Palladium-Based Alloy Film in Medium and Low Temperature Ranges", Spring Meeting (2013) of The Japan Institute of Metals and Materials; Poster Session, Outline of the Society of the Japan Society of Metallurgy, Japan Society of Metals, 2013, vol. 152, p. 81, Japan Society, Japan, Nippon Metal Society, Ltd.

* cited by examiner (a)

(b)

HYDROGEN-RELEASING FILM

CROSS REFERENCE TO RELATED APPLICATIONS

This application is a National Stage of International Application No. PCT/JP2015/067000 filed Jun. 12, 2015, claiming priority based on Japanese Patent Application No. 2014-123485 filed Jun. 16, 2014, the contents of all of which are incorporated herein by reference in their entirety.

TECHNICAL FIELD

The present invention relates to a hydrogen-releasing film that is provided on an electrochemical element or the like such as a battery, a condenser, a capacitor, a sensor, or the like. Specifically, the present invention relates to a hydrogen-releasing film having a function of releasing the generated hydrogen to the outside in a usage environment of about 150° C. or less, in an electrochemical element or the like whose internal pressure is increased due to the hydrogen gas generated during use.

BACKGROUND ART

In recent years, aluminum electrolytic capacitors have been used in an application for inverters such as the wind power generation and solar power generation, and large-scale power sources such as batteries. In the aluminum electrolytic capacitors, hydrogen gas may be generated therein by a reverse voltage, overvoltage, and overcurrent, and there is a risk of rupture of an outer case by an increase in the internal pressure due to the generation of a large amount of hydrogen gas.

Therefore, ordinary aluminum electrolytic capacitors are provided with a safety valve having a special film. In addition to a function of releasing hydrogen gas in the inside of the capacitor to the outside, the safety valve has another function of preventing the rupture of the capacitor itself by self-destruction enabling to decrease the internal pressure of the capacitor when it is abruptly increased. As the special film that is a component of such a safety valve, for example, the following has been proposed.

Patent Document 1 has proposed a pressure regulator film equipped with a foil strip composed of a Pd—Ag alloy wherein 20 wt % (19.8 mol %) of Ag is incorporated into palladium.

However, the foil strip of Patent Document 1 had a problem such that it tends to become brittle under the circumstances of about 50-60° C. or less and thus cannot maintain the function as a pressure regulator film for a long period of time. Further, as a result of studies by the present inventors, it was newly confirmed that there is a problem that a pressure regulator film is deteriorated to decrease the hydrogen-releasing function, due to the gas generated from a portion of the organic material used in the components and accessories in an exterior case for electrochemical elements.

On the other hand, lithium-ion batteries are widely used in cellular phones, notebook computers, automobiles, or the like. Also in recent years, an interest in security for the lithium-ion batteries has grown in addition to higher capacity and improved cycle characteristics. In particular, gas generation in the cells of the lithium-ion batteries is known, and expansion and rupture of the battery pack accompanied with an internal pressure rise are concerned.

Patent Document 2 discloses use of an amorphous alloy (for example, 36Zr-64Ni alloy) composed of zirconium (Zr) and nickel (Ni) as a hydrogen permselective alloy film that selectively permeates hydrogen gas generated in the battery.

However, since the amorphous alloy becomes brittle due to the formation of a hydride compound ($ZrH_2$) upon contact with hydrogen at a low temperature range (e.g. 50° C.), such alloy had a problem in that it could not maintain the function as a pressure regulator film for a long period of time.

PRIOR ART DOCUMENT

Patent Documents

Patent Document 1: Japanese patent No. 4280014
Patent Document 2: JP-A-2003-297325

SUMMARY OF THE INVENTION

Problems to be Solved by the Invention

The present invention has been made in view of the above problems, and an object thereof is to provide a hydrogen-releasing film, a composite hydrogen-releasing film and a hydrogen-releasing laminated film, which are less susceptible to embrittling at an ambient operating temperature of an electrochemical element. The present invention aims to provide a hydrogen-releasing film, a composite hydrogen-releasing film, and a hydrogen-releasing laminated film that have a characteristic of being not prone to deterioration due to the gas generated from the organic material, in addition to the above-described characteristics. In addition, it is another object of the present invention to provide a safety valve for an electrochemical element, wherein the valve is provided with the hydrogen-releasing film, the composite hydrogen-releasing film or the hydrogen-releasing laminated film, and to provide an electrochemical element having the safety valve. Another object of the present invention is to provide a hydrogen-releasing method including using a hydrogen-releasing film, a composite hydrogen-releasing film, a hydrogen-releasing laminated film, or a safety valve for an electrochemical element.

Means for Solving the Problems

The invention is related to a hydrogen-releasing film containing an alloy, wherein the alloy is a Pd—Au alloy, and the Au content in the Pd—Au alloy is 15 mol % or more.

A hydrogen-releasing film containing a Pd—Ag alloy has a function to dissociate a hydrogen molecule into a hydrogen atom on the film surface; solve the hydrogen atom in the film; diffuse the hydrogen atom-solution to the low pressure side from the high pressure side; convert the hydrogen atom into the hydrogen molecule again on the film surface of the low pressure side; and release the hydrogen gas. In addition, the Pd—Ag alloy is known to have a hydrogen separation function in a temperature range of 400 to 600° C.

The reason why the Pd-20 wt % Ag alloy of Patent Document 1 easily becomes brittle under the circumstances of about 50-60° C. or less is considered as follows. The Pd-20 wt % Ag alloy is considered to have the following properties: α-lattice phase is difficult to change even if hydrogen atoms are solved in the high-temperature range, but a phase change of part of α-lattice phase into β-lattice phase occurs when the hydrogen atoms are solved in the low temperature range of about 50-60° C. or less, and a phase change of β-lattice phase into α-lattice phase occurs again upon dehydrogenation. And since the lattice coefficient of the β-lattice phase is larger than that of the α-lattice phase, a distortion occurs in a region ($\alpha+\beta$ lattice phase) where the $\alpha$-lattice phase and the $\beta$-lattice phase coexist. Therefore, if formation of hydrogen solution and dehydrogenation are repeated, destruction is considered to occur due to distortion in the $\alpha+\beta$ lattice phase, resulting in causing embrittlement of the Pd-20 wt % Ag alloy.

The present inventors found that a hydrogen-releasing film formed by using a Pd—Au alloy wherein the Au content is 15 mol % or more instead of a Pd—Ag alloy becomes less susceptible to embrittling even in a low temperature range of about 50-60° C. or less. Even if hydrogen atoms are solved in the Pd—Au alloy in which the Au content is 15 mol % or more, in a low temperature range of about 50-60° C. or less, phase change of $\alpha$-lattice phase into $\beta$-lattice phase does not easily occur, that is, ($\alpha+\beta$)-lattice phase is considered not to be easily formed. Therefore, it is thought that embrittling in the Pd—Au alloy of the present invention is unlikely to occur even if formation of hydrogen solution and dehydrogenation are repeated. Further, the present inventors found that the hydrogen-releasing film containing the Pd—Au alloy having the Au content of 15 mol % or more is hardly deteriorated by the gas generated from the organic material used in the components and accessories in an exterior case for electrochemical elements.

The hydrogen-releasing film preferably contains a Pd—Au alloy in which the Au content is 15 to 55 mol %, and it is preferable that the film thickness t (m) and the film area s (m$^2$) satisfy the following expression 1.

$$t/s < 41.1 \text{ m}^{-1} \qquad \text{<Expression 1>}$$

The hydrogen-releasing film provided to an electrochemical element is determined to have a hydrogen permeation amount of 10 ml/day or more ($4.03 \times 10^{-4}$ mol/day or more: calculated according to SATP (temperature 25° C.; volume of 1 mol ideal gas at an atmospheric pressure of 1 bar: 24.8 L)) at square root of 76.81 Pa$^{1/2}$ (0.059 bar) of the pressure. The hydrogen-releasing film having the Au content of 15 to 55 mol % in the Pd—Au alloy of the present invention has a hydrogen permeation coefficient of $3.6 \times 10^{-12}$ to $2.5 \times 10^{-9}$ (mol·m$^{-1}$·sec$^{-1}$·Pa$^{-1/2}$) at 50° C. Here, the hydrogen permeability coefficient is determined by the following expression 2.

$$\text{Hydrogen permeation coefficient} = (\text{Hydrogen moles} \times \text{film thickness } t)/(\text{film area } s \times \text{time} \times \text{Square root of pressure}) \qquad \text{<Expression 2>}$$

In the case where the hydrogen permeation amount is 10 ml/day ($4.03 \times 10^{-4}$ mol/day) and the hydrogen permeation coefficient is $2.5 \times 10^{-9}$ (mol·m$^{-1}$·sec$^{-1}$·Pa$^{-1/2}$), each numerical value is assigned to the expression 2 as follows.

$$2.5 \times 10^{-9} = (4.03 \times 10^{-4} \times \text{film thickness } t)/(\text{film area } s \times 86400 \times 76.81)$$

$$2.5 \times 10^{-9} = 6.08 \times 10^{-11} \times \text{film thickness } t/\text{film area } s$$

$$\text{Film thickness } t/\text{Film area } s = 41.1 \text{ m}^{-1}$$

Therefore, in the case of using a hydrogen permeation film having a hydrogen permeation coefficient of $3.6 \times 10^{-12}$ to $2.5 \times 10^{-9}$ (mol·m$^{-1}$·sec$^{-1}$·Pa$^{-1/2}$) at 50° C., the condition in which the hydrogen permeation amount becomes 10 ml/day or more ($4.03 \times 10^{-4}$ mol/day or more) satisfies the following expression: film thickness t/film area s<41.1 m$^{-1}$.

The Pd—Au alloy may further contain a Group IB and/or Group IIIA metal. In that case, the total content of Au and the metal in the Pd—Au alloy is preferably 55 mol % or less.

The composite hydrogen-releasing film of the present invention has the hydrogen-releasing film on one surface or both surfaces of a metal layer. By providing the hydrogen-releasing film on one surface or both surfaces of the metal layer, it is possible to prevent the metal layer from being deteriorated by the gas generated from the organic material.

The hydrogen-releasing laminated film of the present invention has a support on one side or both sides of the hydrogen-releasing film or the composite hydrogen-releasing film. The support is provided in order to prevent the hydrogen-releasing film or the like from falling into the electrochemical element when the hydrogen-releasing film or the like are detached from the safety valve. In addition, the hydrogen-releasing film or the like are required to have a self-destructive function as a safety valve when the internal pressure of the electrochemical element becomes equal to or greater than a predetermined value. If the hydrogen-releasing film or the like are a thin film, it has a risk of self-destruction before the internal pressure of the electrochemical element reaches a predetermined value because of the low mechanical strength of the hydrogen-releasing film or the like and results in failure to fulfill the function as a safety valve. Therefore, when the hydrogen-releasing film or the like are a thin film, it is preferable to laminate a support on one side or both sides of the hydrogen-releasing film or the like in order to improve the mechanical strength.

The support is preferably a porous body having an average pore diameter of 100 µm or less. If the average pore diameter is more than 100 µm, the surface smoothness of the porous body decreases, because of which in the production of the hydrogen-releasing film or the like by the sputtering method or the like, it becomes difficult to form a hydrogen-releasing film or the like having a uniform film thickness on the porous body, or pinholes or cracks tend to easily occur in the hydrogen-releasing film or the like.

The support is preferably formed from at least one polymer selected from the group consisting of polytetrafluoroethylene, polysulfone, polyimide, polyamide-imide, and aramid, in view of chemical and thermal stability.

Also, the present invention relates to a safety valve for an electrochemical element, which is provided with the hydrogen-releasing film, the composite hydrogen-releasing film or the hydrogen-releasing laminated film, and relates to an electrochemical element having the safety valve. The electrochemical element includes, for example, an aluminum electrolytic capacitor and a lithium ion battery.

Also, the present invention relates to a hydrogen-releasing method containing using the hydrogen-releasing film, the composite hydrogen-releasing film, the hydrogen-releasing laminated film, or the safety valve for an electrochemical element.

In the hydrogen-releasing method according to the present invention, it is preferable to release hydrogen in an environment of 150° C. or less by using the hydrogen-releasing film or the like.

Effect of the Invention

The hydrogen-releasing film, the composite hydrogen-releasing film, and the hydrogen-releasing laminated film of the present invention have characteristics that the films are not prone to embrittlement at the usage environmental temperatures of electrochemical elements and are hardly deteriorated by the gas generated from the organic material. In addition, the hydrogen-releasing film, the composite hydrogen-releasing film and the hydrogen-releasing laminated film of the present invention not only can rapidly release only the hydrogen gas generated in the inside of the electrochemical element to the outside, but also can prevent impurities from the outside from penetrating the inside of the electrochemical element. Moreover, a safety valve provided with the hydrogen-releasing film, the composite hydrogen-releasing film or the hydrogen-releasing laminated film of the present invention can reduce the internal pressure by self-destruction if the internal pressure of the electrochemical element has rapidly increased, so that the rupture of the electrochemical element itself can be prevented. These effects enable the performance of the electrochemical element to be maintained for a long time, making it possible to prolong the life of the electrochemical element.

MODE FOR CARRYING OUT THE INVENTION

Figure 1:
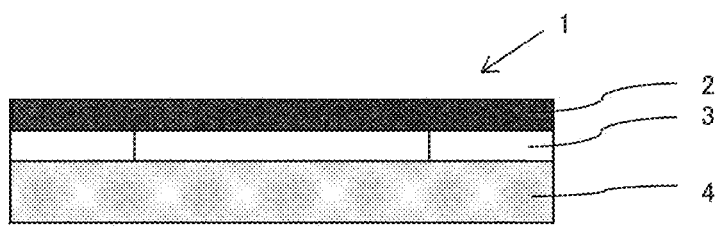
FIG. 1 is a schematic sectional view showing the structure of the hydrogen-releasing laminated film of the present invention.
Figure 1:
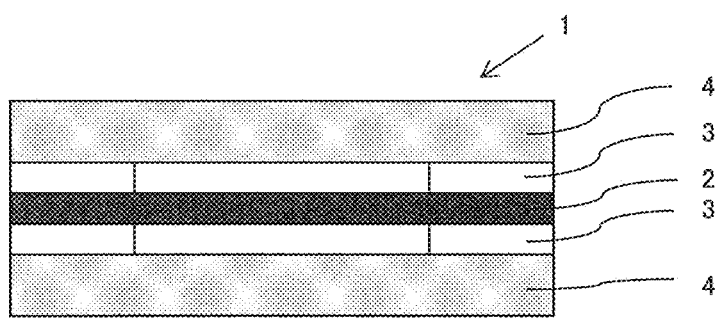

Hereinafter, embodiments of the present invention will be described.

As the raw material for the hydrogen-releasing film of the present invention, a Pd—Au alloy in which the Au content is 15 mol % or more is used. The higher the content of Au becomes, the more difficult the hydrogen embrittlement in a low temperature range occurs. Thus, the Au content is preferably 25 mol % or more, more preferably 30 mol % or more. Further, if the Au content is 15 mol % or more, it is possible to suppress deterioration of the hydrogen-releasing film due to the gas generated from the organic material. On the other hand, if the Au content is too high, the hydrogen permeation rate tends to decrease. Thus, the Au content is preferably 55 mol % or less, more preferably 50 mol % or less, even more preferably 45 mol % or less, and particularly preferably 40 mol % or less.

In addition, the Pd—Au alloy may contain a Group IB and/or Group IIIA metal as long as the effects of the present invention are not impaired. For example, the Pd—Au alloy may contain Ag and/or Cu. That is, the Pd—Au alloy may be an alloy containing three components of Pd—Au—Ag, or may be an alloy containing three components of Pd—Au—Cu. Further, the Pd—Au alloy may be an alloy containing four components of Pd—Au—Ag—Cu. Thus, in the case of a multicomponent alloy containing Pd, Au, and other metals, the total content of Au and other metals in the Pd—Au alloy is preferably 55 mol % or less, more preferably 50 mol % or less, even more preferably 45 mol % or less, and particularly preferably 40 mol % or less.

The hydrogen-releasing film of the present invention can be produced by, for example, a rolling method, a sputtering method, a vacuum deposition method, an ion plating method, and a plating method, but when producing a thick hydrogen-releasing film, it is preferable to use the rolling method and when producing a thin hydrogen-releasing film, it is preferable to use the sputtering method.

The rolling method may be a hot rolling method or a cold rolling method. The rolling method is a method comprising rotating a pair or pairs of rolls (rollers) and processing a raw material, Pd—Au alloy into a film by passing it between the rolls under pressure.

The thickness of the hydrogen-releasing film obtained by the rolling method is preferably 5 to 50 µm, more preferably 10 to 30 µm. If the thickness of the film is less than 5 µm, pinholes or cracks are likely to occur in the production of the film, and deformation of such a film easily occurs after absorbing hydrogen. On the other hand, when the thickness of the film is more than 50 µm, such a film is not desirable because its hydrogen-releasing performance is reduced due to a longtime required for the hydrogen permeation and because the film is inferior in terms of cost.

The sputtering method is not particularly limited, and can be carried out by using a sputtering apparatus such as a parallel flat plate type sputtering apparatus, a sheet type sputtering apparatus, a passing type sputtering apparatus, a DC sputtering apparatus, and an RF sputtering apparatus. For example, after having attached a substrate to a sputtering apparatus in which a Pd—Au alloy target is placed, the sputtering apparatus is evacuated, adjusted to a predetermined pressure value with an Ar gas, and a predetermined sputtering current is charged to the Pd—Au alloy target, thereby to form a Pd—Au alloy film on the substrate. Then, the Pd—Au alloy film is peeled off from the substrate to obtain a hydrogen-releasing film. It should be noted that it is possible to use, as the target, a single or multiple targets according to the hydrogen-releasing film to be produced.

As the substrate, it includes, for example, a glass plate, a ceramic plate, a silicon wafer, and a metal plate such as aluminum and stainless steel.

The thickness of the hydrogen-releasing film obtained by the sputtering method is preferably 0.01 to 5 µm, more preferably 0.05 to 2 µm. If the thickness of the film is less than 0.01 µm, not only may pinholes be formed, but also it is difficult to obtain a required mechanical strength. Also, when the film is peeled off from the substrate, it is likely to be damaged and its handling after the peeling becomes difficult. On the other hand, when the thickness of the film is more than 5 µm, it takes time to produce the hydrogen-releasing film and such a film is inferior in regards to cost, which is not desirable.

The film area of the hydrogen-releasing film can be appropriately adjusted in consideration of the hydrogen permeation amount and the film thickness, but when the hydrogen-releasing film is used as a component of a safety valve, the film area is about 0.01 to 100 mm$^2$. It should be noted that the film area in the present invention is an area of actually releasing hydrogen in the hydrogen-releasing film and does not include a portion coated with a ring-shaped adhesive which will be described later.

A composite hydrogen-releasing film may be formed by providing the hydrogen-releasing film on one surface or both surfaces of a metal layer.

The metal that forms the metal layer is not particularly limited as long as it is a single metal or an alloy having a hydrogen permeation function, and examples include Pd, Nb, Ta, Ni, Fe, Al, Cu, Ru, Re, Rh, Au, Pt, Ag, Cr, Co, Sn, Zr, Y, Ce, Ti, Ir, Mo, and alloys containing two or more kinds of these metals.

The metal layer is preferably an alloy layer containing a Pd alloy. Other metals that form the Pd alloy are not particularly limited. It is preferable to use a Group 11 element, and it is more preferable to use at least one kind selected from the group consisting of Ag and Cu. The Pd alloy preferably contains a Group 11 element in an amount of 20 to 65 mol %, more preferably 30 to 65 mol %, even more preferably 30 to 60 mol %. In addition, an alloy layer containing a Pd—Ag alloy having an Ag content of 20 mol % or more, or a Pd—Cu alloy having a Cu content of 30 mol % or more is preferable because such an alloy layer is not prone to embrittlement even in a low temperature range of about 50 to 60° C. or less. Further, the Pd alloy may contain a Group IB and/or Group IIIA metal as long as the effects of the present invention are not impaired.

The metal layer can be prepared in the same manner as in the hydrogen-releasing film. In addition, the thickness of the metal layer is preferably almost the same as the thickness of the hydrogen-releasing film.

The method for providing the hydrogen-releasing film on one surface or both surfaces of the metal layer is not particularly limited. Examples of the method include a sputtering method, a vacuum deposition method, an ion plating method, and a plating method. A ring-shaped adhesive may also be used in such a method.

The hydrogen-releasing laminated film may be formed by providing a support on one side or both sides of the hydrogen-releasing film or the composite hydrogen-releasing film. In particular, since the hydrogen-releasing film or the like obtained by the sputtering method has a thin film thickness, it is preferable to laminate a support on one side or both sides of the hydrogen-releasing film or the like in order to improve the mechanical strength.

Figure 2:
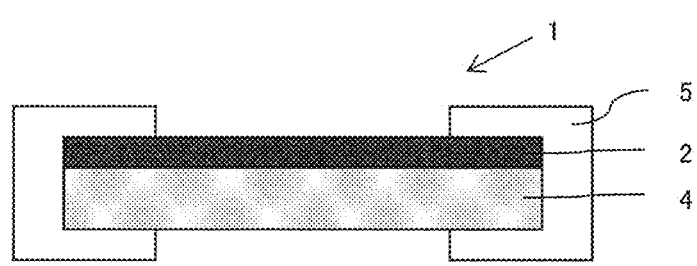
FIG. 2 is a schematic sectional view showing the structure of the hydrogen-releasing laminated film of the present invention.
Figure 2:
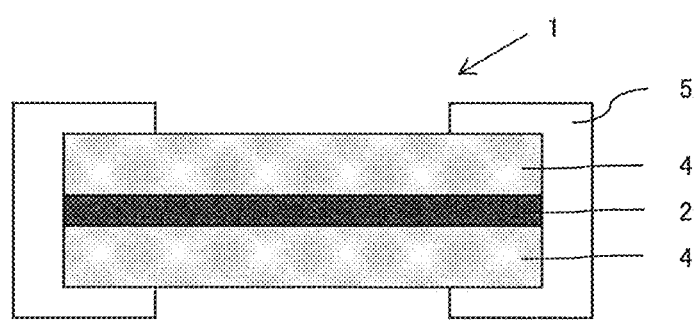

FIG. 1 and FIG. 2 are each a schematic sectional view showing the structure of a hydrogen-releasing laminated film 1 of the present invention. As shown in FIG. 1(a) or 1(b), a support 4 may be laminated on one side or both sides of a hydrogen-releasing film 2 using a ring-shaped adhesive 3, and as shown in FIG. 2(a) or 2(b), the support 4 may be laminated on one side or both sides of the hydrogen-releasing film 2 using a jig 5.

The support 4 is hydrogen permeable and is not particularly limited as long as it can support the hydrogen-releasing film 2. The support may be a non-porous body or may be a porous body. When using a porous body as the support 4, a sponge structure or a finger-void structure is preferred. Also, the support 4 may be a woven fabric or may be a non-woven fabric. As a material for forming the support 4, it includes, for example, polyolefin such as polyethylene and polypropylene, polyester such as polyethylene terephthalate and polyethylene naphthalate, polyarylethersulfone such as polysulfone and polyethersulfone, fluororesin such as polytetrafluoroethylene and polyvinylidene fluoride, epoxy resin, polyamide, polyimide, polyamide-imide, aramid and the like. Of these, at least one kind selected from the group consisting of polytetrafluoroethylene, polysulfone, polyimide, polyamide-imide, and aramid, which are chemically and thermally stable, is preferably used.

The thickness of the support 4 is not particularly limited, but is usually about 5 to 1000 μm, preferably 10 to 300 μm.

When producing the hydrogen-releasing film 2 by the sputtering method, such film can be directly formed on the support 4 which is used as a substrate and the hydrogen-releasing laminated film 2 can be produced without using the adhesive 3 or jig 5. Thus, this method is preferable from the viewpoint of physical properties and production efficiency of the hydrogen-releasing laminated film 1. In that case, it is preferable to use, as the support 4, a porous body having an average pore diameter of 100 μm or less, more preferable to use a porous body having an average pore diameter of 5 μm or less, and particularly preferable to use an ultrafiltration membrane (UF membrane).

The shape of the hydrogen-releasing film, the composite hydrogen-releasing film and the hydrogen-releasing laminated film of the present invention may be substantially circular or polygonal such as triangle, square, and pentagon. Any shape can be taken depending on the application to be described later.

The hydrogen-releasing film, the composite hydrogen-releasing film and the hydrogen-releasing laminated film of the present invention are particularly useful as a component of a safety valve for an aluminum electrolytic capacitor or a lithium ion battery. Furthermore, the hydrogen-releasing film, the composite hydrogen-releasing film and the hydrogen-releasing laminated film of the present invention may be provided on an electrochemical element as a hydrogen-releasing valve aside from the safety valve.

The method for releasing hydrogen generated in the inside of the electrochemical element by using the hydrogen-releasing film, the composite hydrogen-releasing film, or the hydrogen-releasing laminated film of the present invention is not particularly limited. However, the hydrogen-releasing film, the composite hydrogen-releasing film, or the hydrogen-releasing laminated film of the present invention can be provided on, for example, a part of an exterior portion of an aluminum electrolytic capacitor or a lithium ion battery so as to be used as a diaphragm between the inside and the outside of the exterior portion. In such a case, the inside and the outside of the exterior portion are separated by the hydrogen-releasing film or the like, and the hydrogen-releasing film or the like does not permeate a gas other than hydrogen. Hydrogen generated in the inside of the exterior portion is released through the hydrogen-releasing film or the like by an increased pressure so that the pressure of the inside of the exterior portion does not increase exceeding a predetermined pressure.

Since the hydrogen-releasing film or the like of the present invention is not embrittled at a low temperature, the film has an advantage that it can be used at a temperature of, for example, 150° C. or less, and further, a temperature of 110° C. or less. That is, depending on the usage, the hydrogen-releasing film or the like of the present invention is especially preferably used in the hydrogen-releasing method for an aluminum electrolytic capacitor or a lithium ion battery which is not used at a high temperature (for example, 400 to 500° C.)

EXAMPLES

Description will be given of the invention with examples, while the invention is not limited to description in the examples.

Example 1

[Preparation of Hydrogen-Releasing Film by Rolling Method (Content of Au: 15 mol %)]

Figure 3:
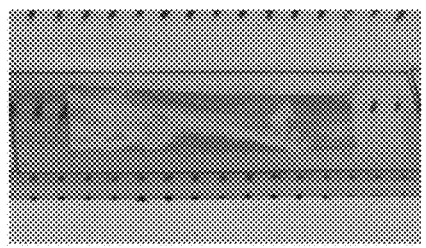
FIG. 3 is a photograph after the evaluation test of the hydrogen-releasing film produced in Example 1.

The raw materials Pd and Au were each weighed so that the content of Au in an ingot became 15 mol %, charged into an arc melting furnace equipped with a water-cooled copper crucible and subjected to arc melting in an Ar gas atmosphere under atmospheric pressure. The obtained button ingot was cold-rolled to a thickness of 5 mm using a two-stage rolling mill having a diameter of 100 mm to obtain a rolled sheet material. Then the rolled sheet material was placed in a glass tube and the both ends of the glass tube were sealed. After reducing the inside pressure of the glass tube to $5 \times 10^{-4}$ Pa at room temperature, the temperature was then raised to 700° C. and the glass tube was allowed to stand for 24 hours, followed by cooling to room temperature. By this heat treatment, the segregation of Pd and Au in the alloy was removed. Then, the sheet material was cold-rolled to 100 μm using a two-stage rolling mill having a roll diameter of 100 mm and further cold-rolled to 25 μm using a two-stage rolling mill having a roll diameter of 20 mm. Then the rolled sheet material was placed in a glass tube and the both ends of the glass tube were sealed. The inside pressure of the glass tube was reduced to $5 \times 10^{-4}$ Pa at room temperature, the temperature was then raised to 500° C., and the glass tube was allowed to stand for 1 hour, followed by cooling to room temperature. By this heat treatment, the internal strain in the Pd—Au alloy caused by rolling was removed, to prepare a hydrogen-releasing film containing Pd—Au and having a thickness of 25 μm and an Au content of 15 mol %. When the hydrogen brittleness of the hydrogen-releasing film was evaluated in the following manner, only a slight distortion in the appearance was observed to the extent that there was no practical problem (see FIG. 3).

Example 2

[Preparation of Hydrogen-Releasing Film by Rolling Method (Content of Au: 20 mol %)]

A hydrogen-releasing film containing Pd—Au and having a thickness of 25 μm and an Au content of 20 mol % was prepared in the same manner as in Example 1, except that the raw materials Pd and Au were respectively used so that the content of Au in an ingot became 20 mol %. When the hydrogen embrittlement of the hydrogen-releasing film was evaluated in the following manner, appearance changes such as distortion were not observed.

Example 3

[Preparation of Hydrogen-Releasing Film by Rolling Method (Content of Au: 30 mol %)]

Figure 4:
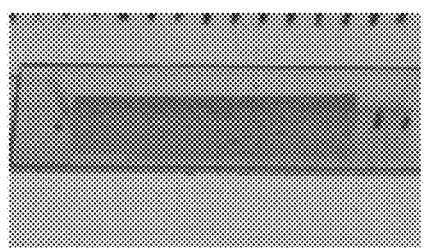
FIG. 4 is a photograph after the evaluation test of the hydrogen-releasing film produced in Example 3.

A hydrogen-releasing film containing Pd—Au and having a thickness of 25 μm and an Au content of 30 mol % was prepared in the same manner as in Example 1, except that the raw materials Pd and Au were respectively used so that the content of Au in an ingot became 30 mol %. When the hydrogen embrittlement of the hydrogen-releasing film was evaluated in the following manner, appearance changes such as distortion were not observed (see FIG. 4).

Example 4

[Preparation of Hydrogen-Releasing Film by Rolling Method (Content of Au: 40 mol %)]

A hydrogen-releasing film containing Pd—Au and having a thickness of 25 μm and an Au content of 40 mol % was prepared in the same manner as in Example 1, except that the raw materials Pd and Au were respectively used so that the content of Au in an ingot became 40 mol %. When the hydrogen embrittlement of the hydrogen-releasing film was evaluated in the following manner, appearance changes such as distortion were not observed.

Example 5

[Preparation of Hydrogen-Releasing Film by Rolling Method (Content of Au: 50 mol %)]

Figure 5:
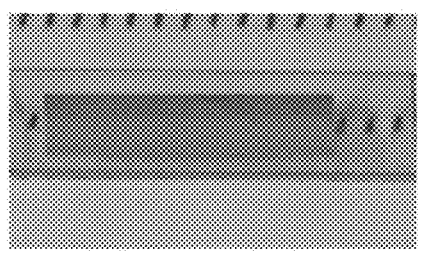
FIG. 5 is a photograph after the evaluation test of the hydrogen-releasing film produced in Example 5.

A hydrogen-releasing film containing Pd—Au and having a thickness of 25 μm and an Au content of 50 mol % was prepared in the same manner as in Example 1, except that the raw materials Pd and Au were respectively used so that the content of Au in an ingot became 50 mol %. When the hydrogen embrittlement of the hydrogen-releasing film was evaluated in the following manner, appearance changes such as distortion were not observed (see FIG. 5).

Example 6

[Preparation of Hydrogen-Releasing Film by Rolling Method (Content of Au: 15 mol %, Content of Ag: 15 mol %)]

Figure 6:
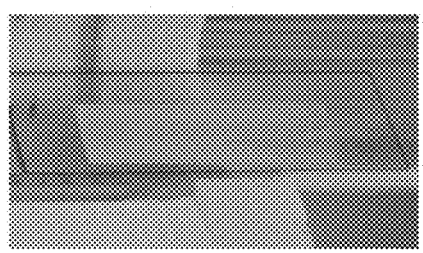
FIG. 6 is a photograph after the evaluation test of the hydrogen-releasing film produced in Example 6.

A hydrogen-releasing film containing Pd—Au—Ag and having a thickness of 25 μm, an Au content of 15 mol % and an Ag content of 15 mol % was prepared in the same manner as in Example 1, except that the raw materials Pd, Au and Ag were respectively used so that the content of Au and Ag in an ingot became each 15 mol %. When the hydrogen embrittlement of the hydrogen-releasing film was evaluated in the following manner, appearance changes such as distortion were not observed (see FIG. 6).

Comparative Example 1

[Preparation of Hydrogen-Releasing Film by Rolling Method (Content of Au: 10 mol %)]

Figure 7:
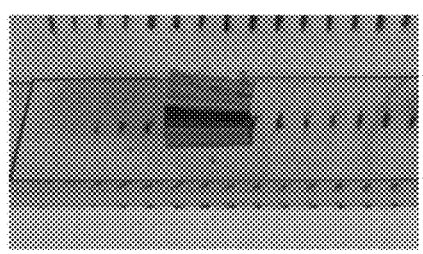
FIG. 7 is a photograph after the evaluation test of the hydrogen-releasing film produced in Comparative Example 1.

A hydrogen-releasing film containing Pd—Au and having a thickness of 25 μm and an Au content of 10 mol % was prepared in the same manner as in Example 1, except that the raw materials Pd and Au were respectively used so that the content of Au in an ingot became 10 mol %. When the hydrogen embrittlement of the hydrogen-releasing film was evaluated in the following manner, a distortion occurred on the hydrogen-releasing film, because of which the film could not be practically used (see FIG. 7).

Comparative Example 2

[Preparation of Hydrogen-Releasing Film by Rolling Method (Content of Ag: 19.8 mol %)]

The raw materials Pd and Ag were each weighed so that the content of Ag in an ingot became 19.8 mol %, charged into an arc melting furnace equipped with a water-cooled copper crucible and subjected to arc melting in an Ar gas atmosphere under atmospheric pressure. The obtained button ingot was cold-rolled to a thickness of 5 mm using a two-stage rolling mill having a diameter of 100 mm to obtain a rolled sheet material. Then the rolled sheet material was placed in a glass tube and the both ends of the glass tube were sealed. After reducing the inside pressure of the glass tube to $5\times10^{-4}$ Pa at room temperature, the temperature was then raised to 700° C. and the glass tube was allowed to stand for 24 hours, followed by cooling to room temperature. By this heat treatment, the segregation of Pd and Ag in the alloy was removed. Then, the sheet material was cold-rolled to 100 µm using a two-stage rolling mill having a roll diameter of 100 mm and further cold-rolled to 25 µm using a two-stage rolling mill having a roll diameter of 20 mm. Then the rolled sheet material was placed in a glass tube and the both ends of the glass tube were sealed. The inside pressure of the glass tube was reduced to $5\times10^{-4}$ Pa at room temperature, the temperature was then raised to 700° C., and the glass tube was allowed to stand for 1 hour, followed by cooling to room temperature. By this heat treatment, the internal strain in the Pd—Ag alloy caused by rolling was removed, to prepare a hydrogen-releasing film containing Pd—Ag and having a thickness of 25 µm and an Ag content of 19.8 mol %. When the hydrogen embrittlement of the hydrogen-releasing film was evaluated in the following manner, a distortion occurred on the hydrogen-releasing film, because of which the film could not be practically used.

Example 7

[Preparation of Hydrogen-Releasing Laminated Film by Sputtering Method (Content of Au: 15 mol %)]

Figure 8:
FIG. 8 is a photograph after the evaluation test of the hydrogen-releasing laminated film produced in Example 7.

A polysulfone porous sheet (pore diameter: 0.001 to 0.02 µm, manufactured by NITTO DENKO CORPORATION) as a support was attached to an RF magnetron sputtering apparatus (manufactured by Sanyu Electron Co., Ltd.) equipped with a Pd—Au alloy target in which the content of Au is 15 mol %. Then, after evacuation of air in the sputtering apparatus to $1\times10^{-5}$ Pa or less, a sputtering current of 4.8 A was applied to the Pd—Au alloy target under an Ar gas pressure of 1.0 Pa to form a Pd—Au alloy film with 400 nm thickness (Au content: 15 mol %) on a polysulfone porous sheet to prepare a hydrogen-releasing laminated film. When the hydrogen-releasing laminated film was evaluated on the hydrogen embrittlement in the following manner, it was found that no cracks were generated on the surface of the film (see FIG. 8).

Example 8

[Preparation of Hydrogen-Releasing Laminated Film by Sputtering Method (Content of Au: 20 mol %)]

A Pd—Au alloy film (Au content: 20 mol %) having a thickness of 400 nm was formed in the same manner as in Example 7, except that a Pd—Au alloy target having an Au content of 20 mol % was used, whereby a hydrogen-releasing laminated film was prepared. When the hydrogen-releasing laminated film was evaluated on the hydrogen embrittlement in the following manner, it was found that no cracks were generated on the surface of the film.

Example 9

[Preparation of Hydrogen-Releasing Laminated Film by Sputtering Method (Content of Au: 30 mol %)]

Figure 9:
FIG. 9 is a photograph after the evaluation test of the hydrogen-releasing laminated film produced in Example 9.

A Pd—Au alloy film (Au content: 30 mol %) having a thickness of 400 nm was formed in the same manner as in Example 7, except that a Pd—Au alloy target having an Au content of 30 mol % was used, whereby a hydrogen-releasing laminated film was prepared. When the hydrogen-releasing laminated film was evaluated on the hydrogen embrittlement in the following manner, it was found that no cracks were generated on the surface of the film (see FIG. 9).

Example 10

[Preparation of Hydrogen-Releasing Laminated Film by Sputtering Method (Content of Au: 40 mol %)]

A Pd—Au alloy film (Au content: 40 mol %) having a thickness of 400 nm was formed in the same manner as in Example 7, except that a Pd—Au alloy target having an Au content of 40 mol % was used, whereby a hydrogen-releasing laminated film was prepared. When the hydrogen-releasing laminated film was evaluated on the hydrogen embrittlement in the following manner, it was found that no cracks were generated on the surface of the film.

Example 11

[Preparation of Hydrogen-Releasing Laminated Film by Sputtering Method (Content of Au: 50 mol %)]

Figure 10:
FIG. 10 is a photograph after the evaluation test of the hydrogen-releasing laminated film produced in Example 11.

A Pd—Au alloy film (Au content: 50 mol %) having a thickness of 400 nm was formed in the same manner as in Example 7, except that a Pd—Au alloy target having an Au content of 50 mol % was used, whereby a hydrogen-releasing laminated film was prepared. When the hydrogen-releasing laminated film was evaluated on the hydrogen embrittlement in the following manner, it was found that no cracks were generated on the surface of the film (see FIG. 10).

Example 12

[Preparation of Hydrogen-Releasing Laminated Film by Sputtering Method (Content of Au: 15 mol %, Content of Ag: 15 mol %)]

Figure 11:
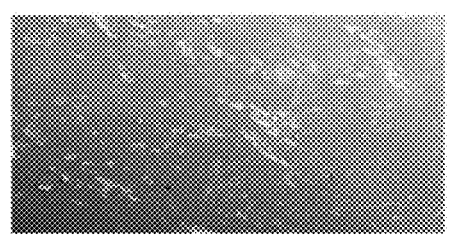
FIG. 11 is a photograph after the evaluation test of the hydrogen-releasing laminated film produced in Example 12.

A Pd—Au—Ag alloy film (Au and Ag contents: each 15 mol %) having a thickness of 400 nm was formed in the same manner as in Example 7, except that a Pd—Au—Ag alloy target having Au and Ag contents of each 15 mol % was used, whereby a hydrogen-releasing laminated film was prepared. When the hydrogen-releasing laminated film was evaluated on the hydrogen embrittlement in the following manner, it was found that no cracks were generated on the surface of the film (see FIG. 11).

Comparative Example 3

[Preparation of Hydrogen-Releasing Laminated Film by Sputtering Method (Content of Au: 10 mol %)]

Figure 12:
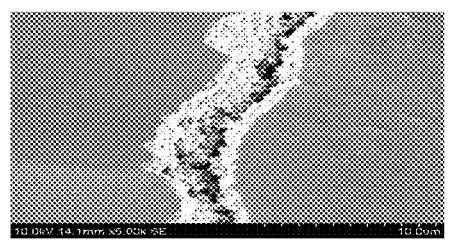
FIG. 12 is a photograph after the evaluation test of the hydrogen-releasing laminated film produced in Comparative Example 3.

A Pd—Au alloy film (Au content: 10 mol %) having a thickness of 400 nm was formed in the same manner as in Example 7, except that a Pd—Au alloy target having an Au content of 10 mol % was used, whereby a hydrogen-releasing laminated film was prepared. When the hydrogen-releasing laminated film was evaluated on the hydrogen embrittlement in the following manner, it was found that cracks were formed on the surface of the film. It is thought that hydrogen embrittlement occurred (see FIG. 12).

Comparative Example 4

[Preparation of Hydrogen-Releasing Laminated Film by Sputtering Method (Content of Ag: 19.8 mol %)]

A Pd—Ag alloy film (Ag content: 19.8 mol %) having a thickness of 400 nm was formed in the same manner as in Example 7, except that a Pd—Ag alloy target having an Ag content of 19.8 mol % was used, whereby a hydrogen-releasing laminated film was prepared. When the hydrogen-releasing laminated film was evaluated on the hydrogen embrittlement in the following manner, it was found that cracks were formed on the surface of the film. It is thought that hydrogen embrittlement occurred.

[Evaluation Method]

(Measurement of Hydrogen Permeation Coefficient)

The prepared hydrogen-releasing film or the prepared hydrogen-releasing laminated film was attached to a VCR connector manufactured by Swagelok Company, and an SUS tube was attached to one side of the connector. In this way, a sealed space (63.5 ml) was produced. After the pressure inside the tube was reduced by a vacuum pump, the pressure of the hydrogen gas was adjusted to 0.15 MPa, and a pressure change in an environment of 50° C. was monitored. Since the number of moles of hydrogen transmitted through the hydrogen-releasing film or the hydrogen-releasing laminated film can be known by the pressure change, a hydrogen permeation coefficient was calculated by substituting the number of moles of hydrogen into the expression 2 below. In addition, the effective film area s of the hydrogen-releasing film used for the measurement is $3.85 \times 10^{-5}$ m$^2$, and the effective film area s of the hydrogen-releasing laminated film is $7.07 \times 10^{-6}$ m$^2$.

Hydrogen permeation coefficient=(Number of moles of hydrogen×Film thickness $t$)/(Film area $s$×time×square root of pressure)  <Expression 2>

(Evaluation of Hydrogen Permeability)

The prepared hydrogen-releasing film or the prepared hydrogen-releasing laminated film was attached to a VCR connector manufactured by Swagelok Company, and an SUS tube was attached to one side of the connector. In this way, a sealed space (63.5 ml) was produced. After the pressure inside the tube was reduced by a vacuum pump, the pressure of the hydrogen gas was adjusted to 0.15 MPa, and a pressure change in an environment of 105° C. was monitored. Since the number of moles of hydrogen (volume) transmitted through the hydrogen-releasing film or the hydrogen-releasing laminated film can be known by the pressure change, this volume was converted to a permeation amount per day and taken as a hydrogen permeation amount. In addition, the effective film area s of the hydrogen-releasing film used for the measurement is $3.85 \times 10^{-5}$ m$^2$, and the effective film area s of the hydrogen-releasing laminated film is $7.07 \times 10^{-6}$ m$^2$.

Example

When the pressure changes from 0.15 MPa to 0.05 MPa (variation 0.10 MPa) in 2 hours, the volume of hydrogen that has passed through the hydrogen-releasing film is 63.5 mL. Therefore, the hydrogen permeation amount per day is 63.5×24÷2=762 mL/day.

In addition, the hydrogen permeability was evaluated based on the following criteria.

◯: 100 mL/day or more

Δ: 10 mL/day or more and less than 100 mL/day x: Less than 10 mL/day (Evaluation of Hydrogen Embrittlement of Hydrogen-Releasing Film Prepared by Rolling Method)

The prepared hydrogen-releasing film was placed in a glass tube and the both ends of the glass tube were sealed. The inside pressure of the glass tube was reduced to a pressure of $5 \times 10^{-3}$ Pa at 50° C., and the temperature was then raised to 400° C. Then hydrogen gas was introduced into the glass tube and allowed to stand for one hour under an atmosphere of 105 kPa. Thereafter, the glass tube was cooled to room temperature and the inside of the glass tube was evacuated to a pressure of $5 \times 10^{-3}$ Pa (30 minutes). Then, hydrogen gas was introduced into the glass tube again and allowed to stand for one hour under an atmosphere of 105 kPa. After repeating the above operation three times, the hydrogen-releasing film was removed from the glass tube and the appearance of the hydrogen-releasing film was visually observed.

(Evaluation of Hydrogen Embrittlement of Hydrogen-Releasing Laminated Film Prepared by Sputtering Method)

The prepared hydrogen-releasing laminated film was placed in a glass tube and the both ends of the glass tube were sealed. After the inside of the glass tube was reduced to a pressure of $5 \times 10^{-3}$ Pa at 50° C., hydrogen gas was introduced into the glass tube and the glass tube was allowed to stand for one hour under an atmosphere of 105 kPa. Thereafter, the hydrogen-releasing laminated film was removed from the glass tube and the surface of the film was observed by SEM.

(Evaluation of Corrosion Resistance A)

PVC sections (1 g) (ESUVIRON sheet A-370, manufactured by SEKISUI SEIKEI Co., Ltd.) and the prepared hydrogen-releasing film or the prepared hydrogen-releasing laminated film (each film: 15 mm×15 mm) were placed in a sealed SUS can, heated at 125° C. for 12 hours, and the gas generated from the PVC was exposed to the surface of the hydrogen-releasing film or the hydrogen-releasing laminated film. Thereafter, the hydrogen permeation amount of the hydrogen-releasing film or the hydrogen-releasing laminated film was measured in the same manner as described above, and corrosion resistance A was evaluated according to the following criteria.

◯: The retention rate of the hydrogen permeation amount before and after the corrosion test is 50% or more.

x: The retention rate of the hydrogen permeation amount before and after the corrosion test is less than 50%.

(Evaluation of Corrosion Resistance B)

Diammonium adipate (2 g) manufactured by Wako Pure Chemical Industries, Ltd. and ethylene glycol (18 g) were placed in a 300-mL separable flask. Then, the prepared hydrogen-releasing film or the prepared hydrogen-releasing laminated film (each film: 15 mm×15 mm) was suspended from the lid of the separable flask and heated at 105° C. for 12 hours. Then, the gas generated from the two compounds was exposed to the surface of the hydrogen-releasing film or the hydrogen-releasing laminated film. Thereafter, the hydrogen permeation amount of the hydrogen-releasing film or the hydrogen-releasing laminated film was measured in the same manner as described above, and corrosion resistance B was evaluated according to the following criteria.

◯: The retention rate of the hydrogen permeation amount before and after the corrosion test is 50% or more.

x: The retention rate of the hydrogen permeation amount before and after the corrosion test is less than 50%.

TABLE 1

| | Example 1 | Example 2 | Example 3 | Example 4 | Example 5 | Example 6 | Comparative Example 1 | Comparative Example 2 |
|---|---|---|---|---|---|---|---|---|
| Composition of alloy | Pd—Au (15%) | Pd—Au (20%) | Pd—Au (30%) | Pd—Au (40%) | Pd—Au (50%) | Pd—Au (15%)—Ag (15%) | Pd—Au (10%) | Pd—Ag (19.8%) |
| Production method | Rolling method | Rolling method | Rolling method | Rolling method | Rolling method | Rolling method | Rolling method | Rolling method |
| Hydrogen permeation coefficient (mol · m$^{-1}$ · sec$^{-1}$ · Pa$^{-1/2}$) | $2.0 \times 10^{-9}$ | $8.1 \times 10^{-10}$ | $3.8 \times 10^{-10}$ | $8.9 \times 10^{-11}$ | $9.8 \times 10^{-12}$ | $2.8 \times 10^{-10}$ | $2.1 \times 10^{-9}$ | $2.6 \times 10^{-9}$ |
| t/s (m$^{-1}$) | 0.65 | 0.65 | 0.65 | 0.65 | 0.65 | 0.65 | 0.65 | 0.65 |
| Hydrogen permeability — Hydrogen permeation amount (mL/day) | 4724 | 1965 | 849 | 227 | 25 | 804 | 4826 | 6971 |
| Hydrogen permeability — Evaluation | ○ | ○ | ○ | ○ | Δ | ○ | ○ | ○ |
| Corrosion resistance A — Hydrogen permeation amount (mL/day) | 4677 | 1886 | 874 | 225 | 25 | 796 | 1448 | 70 |
| Corrosion resistance A — Retention rate (%) | 99 | 96 | 103 | 99 | 100 | 99 | 30 | 1 |
| Corrosion resistance A — Evaluation | ○ | ○ | ○ | ○ | ○ | ○ | x | x |
| Corrosion resistance B — Hydrogen permeation amount (mL/day) | 2645 | 1120 | 611 | 198 | 25 | 611 | 1062 | 139 |
| Corrosion resistance B — Retention rate (%) | 56 | 57 | 72 | 87 | 100 | 76 | 22 | 2 |
| Corrosion resistance B — Evaluation | ○ | ○ | ○ | ○ | ○ | ○ | x | x |

| | Example 7 | Example 8 | Example 9 | Example 10 | Example 11 | Example 12 | Comparative Example 3 | Comparative Example 4 |
|---|---|---|---|---|---|---|---|---|
| Composition of alloy | Pd—Au (15%) | Pd—Au (20%) | Pd—Au (30%) | Pd—Au (40%) | Pd—Au (50%) | Pd—Au (15%)—Ag (15%) | Pd—Au (10%) | Pd—Ag (19.8%) |
| Production method | Sputtering method | Sputtering method | Sputtering method | Sputtering method | Sputtering method | Sputtering method | Sputtering method | Sputtering method |
| Hydrogen permeation coefficient (mol · m$^{-1}$ · sec$^{-1}$ · Pa$^{-1/2}$) | $2.5 \times 10^{-9}$ | $7.0 \times 10^{-10}$ | $4.0 \times 10^{-10}$ | $7.0 \times 10^{-11}$ | $1.4 \times 10^{-11}$ | $2.0 \times 10^{-10}$ | $2.6 \times 10^{-9}$ | $2.4 \times 10^{-9}$ |
| t/s (m$^{-1}$) | 0.057 | 0.057 | 0.057 | 0.057 | 0.057 | 0.057 | 0.057 | 0.057 |
| Hydrogen permeability — Hydrogen permeation amount (mL/day) | 63,696 | 19,504 | 10,265 | 2,053 | 407 | 6,599 | 68,630 | 73,910 |
| Hydrogen permeability — Evaluation | ○ | ○ | ○ | ○ | ○ | ○ | ○ | ○ |
| Corrosion resistance A — Hydrogen permeation amount (mL/day) | 63,059 | 18,919 | 10,368 | 1,991 | 407 | 6,467 | 26,080 | 739 |
| Corrosion resistance A — Retention rate (%) | 99 | 97 | 101 | 97 | 100 | 98 | 38 | 1 |
| Corrosion resistance A — Evaluation | ○ | ○ | ○ | ○ | ○ | ○ | x | x |
| Corrosion resistance B — Hydrogen permeation amount (mL/day) | 36,307 | 11,312 | 7,699 | 1,807 | 407 | 5,081 | 17,158 | 2,217 |
| Corrosion resistance B — Retention rate (%) | 57 | 58 | 75 | 88 | 100 | 77 | 25 | 3 |
| Corrosion resistance B — Evaluation | ○ | ○ | ○ | ○ | ○ | ○ | x | x |

INDUSTRIAL APPLICABILITY

The hydrogen-releasing film, the composite hydrogen-releasing film and the hydrogen-releasing laminated film according to the present invention are preferably used as a component of a safety valve provided on an electrochemical element such as a battery, a condenser, a capacitor, a sensor, and the like.

DESCRIPTION OF REFERENCE SIGNS

1: Hydrogen-releasing laminated film
2: Hydrogen-releasing film
3: Adhesive
4: Support
5: Jig

The invention claimed is:

1. A hydrogen-releasing film containing an alloy, wherein the alloy is a Pd—Au alloy consisting of Pd and Au, and the Au content in the Pd—Au alloy is 30 to 55 mol %.

2. The hydrogen-releasing film according to claim 1, wherein the film thickness t and the film area s satisfy the following expression 1:

$$t/s < 41.1 \text{ m}^{-1} \qquad \text{<Expression 1>}$$

3. A composite hydrogen-releasing film, comprising the hydrogen-releasing film according to claim 1 on one surface or both surfaces of a metal layer.

4. A hydrogen-releasing laminated film, comprising a support on one surface or both surfaces of the hydrogen-releasing film according to claim 1.

5. The hydrogen-releasing laminated film according to claim 4, wherein the support is a porous body having an average pore diameter of 100 μm or less.

6. The hydrogen-releasing laminated film according to claim 4, wherein a raw material of the support is at least one kind selected from the group consisting of polytetrafluoroethylene, polysulfone, polyimide, polyamide-imide, and aramid.

7. A safety valve for an electrochemical element, wherein the valve is provided with the hydrogen-releasing film according to claim 1.

8. An electrochemical element, wherein the element is provided with the safety valve according to claim 7.

9. The electrochemical element according to claim 8, wherein the electrochemical element is an aluminum electrolytic capacitor or a lithium ion battery.

10. A hydrogen-releasing method comprising using the hydrogen-releasing film according to claim 1.

11. The hydrogen-releasing method according to claim 10, wherein hydrogen is released in an environment of 150° C. or less.

\* \* \* \* \*